United States Patent [19]
Jorgenson

[11] 3,831,772
[45] Aug. 27, 1974

[54] LOGGING GRAPPLE AND HAULING ASSEMBLY

[76] Inventor: Edward Bjarnie Jorgenson, 574 Lowry Lane, North Vancouver, Canada

[22] Filed: Mar. 8, 1973

[21] Appl. No.: 339,439

[52] U.S. Cl.................. 212/84, 212/90, 212/91, 294/111
[51] Int. Cl........................................ B66c 21/00
[58] Field of Search...... 294/112, 111, 110; 212/84, 212/76, 77, 83, 87, 89, 90, 91, 96, 97

[56] References Cited
UNITED STATES PATENTS
3,407,942  10/1968  McIntyre et al. .................. 212/84
3,584,747  6/1971  Ekelund .............................. 212/84
3,594,034  7/1971  Rowell ............................... 294/111

*Primary Examiner*—Richard A. Schacher
*Assistant Examiner*—James L. Rowland
*Attorney, Agent, or Firm*—Carver and Company

[57] ABSTRACT

A logging grapple and hauling assembly having an aerial carriage supported on a cable for controlled movement over a treed area and which carries a depending grapple the latter being remotely operable between closed and opened positions and having laterally extending grappling arms so as to enable the grapple to grasp a standing tree and the carriage then operated to uproot and drag the tree to the landing site.

3 Claims, 3 Drawing Figures

LOGGING GRAPPLE AND HAULING ASSEMBLY

BACKGROUND OF THE INVENTION

1. Field of the Invention

This invention relates to haulage assemblies in logging operations and in particular to a grapple and operating mechanisms therefore.

2. Prior Art

In logging operations, presently known, the trees are first felled then delimbed and then cut into easily transportable lengths. The cut and limbed logs are then transported to a landing site by known means such as an overhead cableway haulage systems.

In some areas, due to terrain, breakage, when the logs are felled, sometimes amounts to as high as thirty percent of lumber available.

Furthermore, also due to the terrain, the fallers experience difficulties in getting to the trees to be felled and then delimbing them. The limbs and other portions of the trees not suitable for further reduction into lumber are left in place on the cut site and later burned as salvage costs are usually too high.

SUMMARY OF THE INVENTION

The present invention provides a novel haulage system and grapple apparatus, operation of which enable trees to be uprooted and transported to a landing site at which they can be delimbed and cut. Loss of valuable lumber through breakage when the tree is normally felled is, consequently, reduced if not eliminated. Limbs and tree tops being readily available can result in greater wood utilization at reduced cost as mechanical cutters and delimbing devices can be used.

The present invention includes a cable haulage system adapted to be extended from a yarder at the landing site over a treed area supporting an aerial carriage, a grapple suspended from the carriage, means operated at the yarder for closing and opening the grapple, the grapple having laterally extending grasping arms for grasping standing trees so that upon operation of the yarder the trees can be uprooted and conveyed to the landing site.

A detailed description following, related to drawings, gives exemplification of the invention which, however, is capable of expression in means other than that particularly described and illustrated.

DETAILED DESCRIPTION

Figure 1:
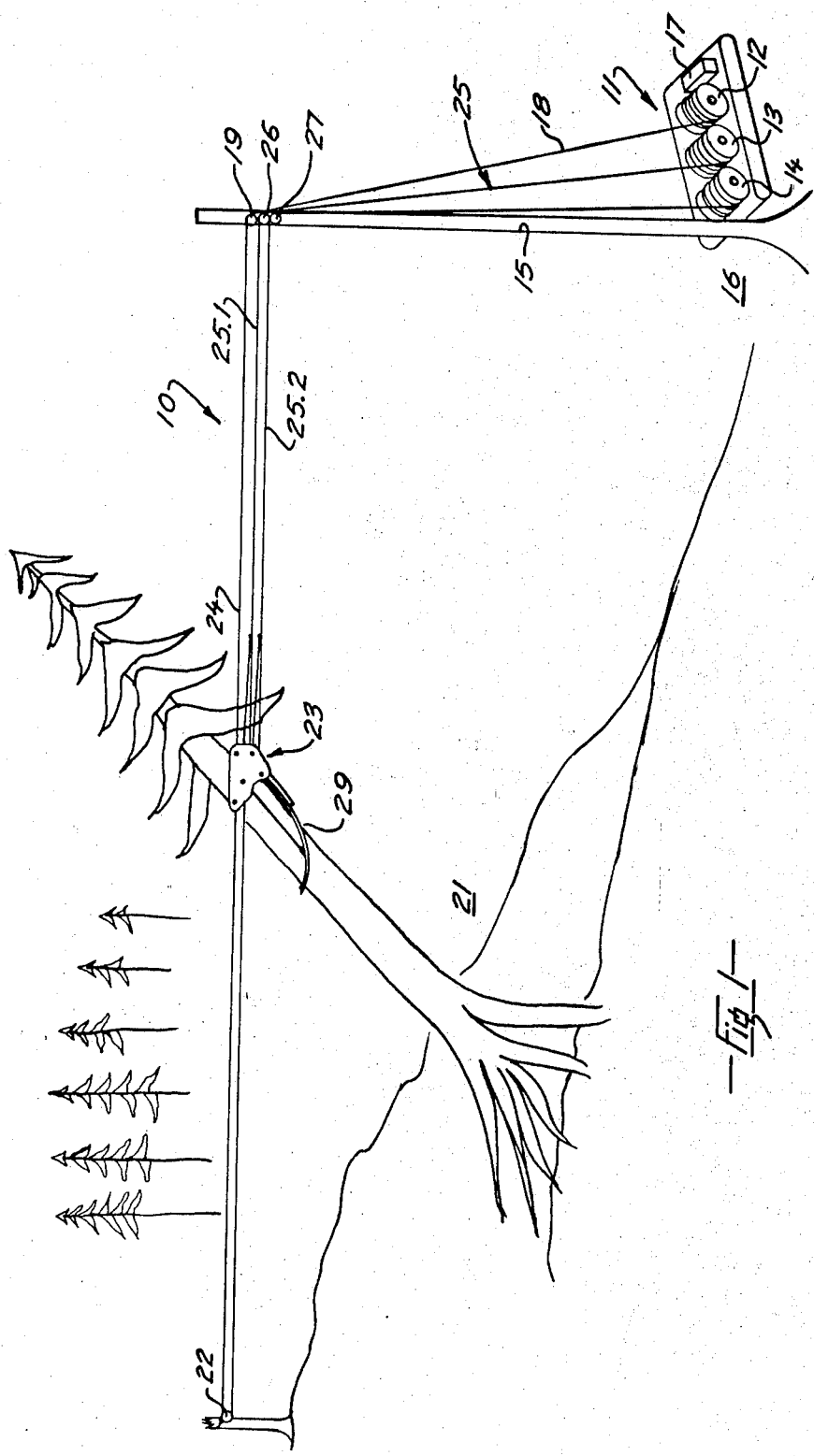
FIG. 1 is a perspective view of hauling and grapple apparatus in accordance with the invention in use in a logging operation.

Referring to the drawings FIG. 1 shows haulage apparatus generally 10 in accordance with the invention used in a tree harvesting operation. The haulage system includes a yarder 11 having winding drums 12, 13 and 14, which is situated beneath a spar 15 at a landing site 16. The winding drums are, conventionally, powered by a driving engine 17 and also have conventional brakes, not shown. A backhaul cable 18 which is wound on the drum 12 extends over a sheave 19 on the spar, passes over the treed area 21 from which trees are to be gained, thence around a tail block 22 secured to a stump or the like and extends to and is connected at its free end to a carriage 23, the carriage being supported for movement on the upper run 24 of the backhaul cable.

A main line 25 having an upper run 25.1 wound on winding drum 13 and a lower run 25.2 wound on drum 14 passes over sheaves 26 and 27 on the spar and is connected to the carriage 23 in a manner hereafter to be described, operation of the carriage, back and forth over the treed area, being effected by appropriately controlling movement of the main and backhaul lines.

The carriage supports a grapple 29, movements of which between open and closed position is controlled by suitable relative movement of the upper and lower runs of the main line.

Figure 2:
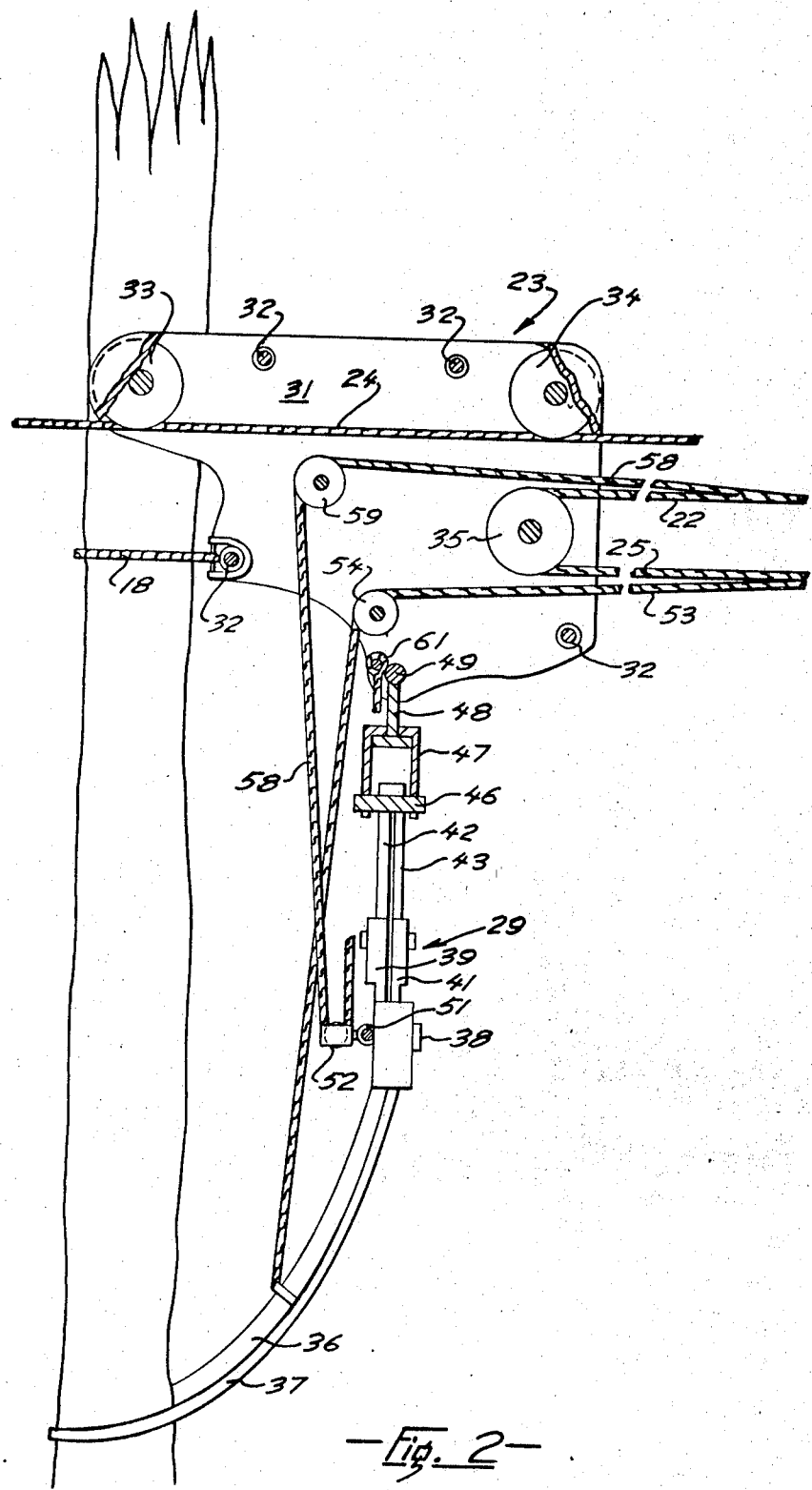
FIG. 2 is an enlarged side view, a portion being broken away, of a portion of the invention showing a portion of a cable hauling system, and a grapple being shown in an open position.
Figure 3:
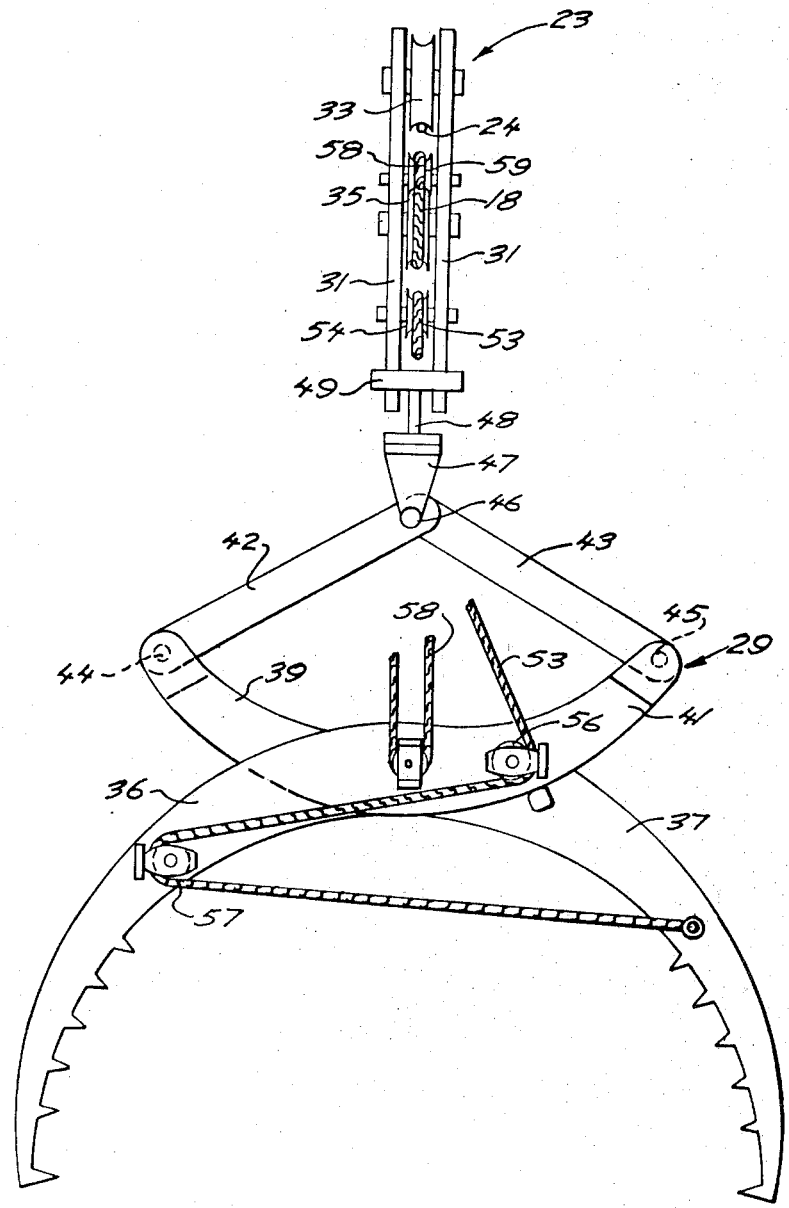
FIG. 3 is an end view of the grapple and carriage component of FIG. 2.

Referring to FIGS. 2 and 3 the carriage 23 has a pair of cheek plates 31—31 maintained in spaced side by side relationship by bolts and spacers, severally 32, and is supported for movement on the backhaul line by longitudinally spaced sheaves 33 and 34. The main line 25 is trained around a main line sheave 35 mounted for rotation between the cheek plates of the carriage.

The grapple 29 is of the crossed-tong type having a pair of bowed grasping arms 36 and 37 mounted on a pivot pin 38. Extension of the grasping arms above the pin constitutes operating arms 39 and 41. As shown in FIG. 2 the the grasping arms extend laterally, in a sweeping curve, out of the swinging plane of the arms represented by a plane normal to the axis of the pivot pin. Link rods 42 and 43 are mounted for pivotal movement at one end on pins 44 and 45 passed through the outer ends of the operating arms 39 and 41. Opposite ends of the link rods are mounted for pivotal movement on a cross pin 46 of a shackle 47 which is rotatably mounted on a vertical arm 48 of a cross pin 49 which extends between the cheek plates 31—31 thus permitting free swivelling movement of the grapple.

Referring to FIG. 2 the pivot pin has a projecting portion terminating in an eye 51 on which a sheave 52 is swingably mounted.

A grapple closure line 53 secured at one end to the lower run 25.2 of the main line, passes over a sheave 54 mounted between the cheek plates ahead of the main line sheave 35 and is trained in a zig-zag manner over sheaves 56 and 57 on the operating arm and grasping arm 41 and 36, respectively, and then connected to the grasping arm 37.

A grapple opening line 58 is connected to the upper run 25.1 of the main line, passes over a sheave 59 ahead of and above the main line sheave 35 thence around the pivot sheave 52 and is connected to the carriage on a transverse bolt 61 just ahead of the shackle 47.

OPERATION

The carriage can be moved back and forth over the treed area at any desired elevation by appropriately controlling the winding drums on which the haulback and main lines are wound. The grapple is opened by taking in the upper run of the main line and letting out the lower run accordingly so as to shorten the opening line. This lifts the grapple upwards towards the carriage thus spreading the link rods and operating arms and thus opening the grasping arms. Due to shortening of the opening line the grapple is also swung upwards so that the lowermost curved portions of the grasping arms are in a substantially horizontal position. The grapple may be closed by reversing movement of the upper and lower runs of the main lines so that tension is applied to the closing line thus closing the arms.

All closing and opening operations of the grapple can thus be remotely controlled from the yarder.

In harvesting the trees the carriage is suitably positioned with the open grapple embracing a tree below the center of gravity of the latter. The closing line is then tightened, as heretofore described, to close the grasping arms around the the tree trunk to gain an initial purchase therearound. To uproot the tree the backhaul line is then slackened off and full power applied to the winding drums 13 and 14 to uproot the tree and the tree is then dragged to the landing site. The tree, when it is being uprooted will usually fall with its top towards the landing site however the swivel connection of the grapple with the carriage relieves any strain on the grapple and haulage system when the tree is being dragged.

Although the haulage system herein described permits only controlled movement of the carriage back and forth between the landing site and the tail block it is to be understood that known haulback systems can be used employing two or more laterally spaced tail blocks to enable lateral positional control of the carriage as well as longitudinal positional control thereof so that trees over a relatively wide area can be harvested.

I claim:

1. Tree harvesting apparatus including:
   a. an aerial cable hauling system having main and back haul line assemblies extending over a treed area and being remotely operable from a yarder at a landing site,
   b. a carriage supported by the cable system and conneced to the main and back haul line assemblies for movement forwards and backwards over the treed area and being adjustable in elevation,
   c. a grapple depending from the carriage, the grapple having pair of arms pivotally mounted intermediate therein on a pivot pin so as to have depending grasping arms and upwardly extending lever arms, and a pair of connecting links pivotally interconnected at the carriage and having a pivotal connection with the ends of the lever arms,
   d. a remotely operable opening line connected to the pivot pin of the grapple and extending upwards over the carriage so that upon tensioning the opening line the grapple is lifted relative to the carriage so as to swing the grasping arms to an open position,
   e. a remotely operable closing line connected to one of the grasping arms and having a running connection with the other grasping arm and passing upwardly over the carriage, adapted when tensioned, to move the grasping arms to a closed position,
   f. both opening and closing lines being arranged so that they pass over the carriage forwards of the pivotal connection of the grapple with the carriage so that when the opening line is tensioned to open the grasping arms, the grasping arms are swung forwardly to enable them to be positioned around a standing tree and when closing line is tensioned the arms remain in said forwardly extending position while they close so that the tree can be uprooted and dragged to a landing site.

2. A tree harvesting apparatus as claimed in claim 1 in which the main line assembly includes a sheave mounted on the carriage, the main line being trained maintained over the sheave so as to provide separately operable upper and lower runs, the closing line being connected to one run and the open line being connected to the other run.

3. A tree harvesting apparatus as claimed in claim 1 in which the grasping arms are bowed forwards from the pivot pin so as to facilitate their being positioned around a standing tree.

* * * * *